June 7, 1960  B. R. ADELMAN  2,939,396
ROCKET GRAIN
Filed Sept. 2, 1954  2 Sheets-Sheet 1
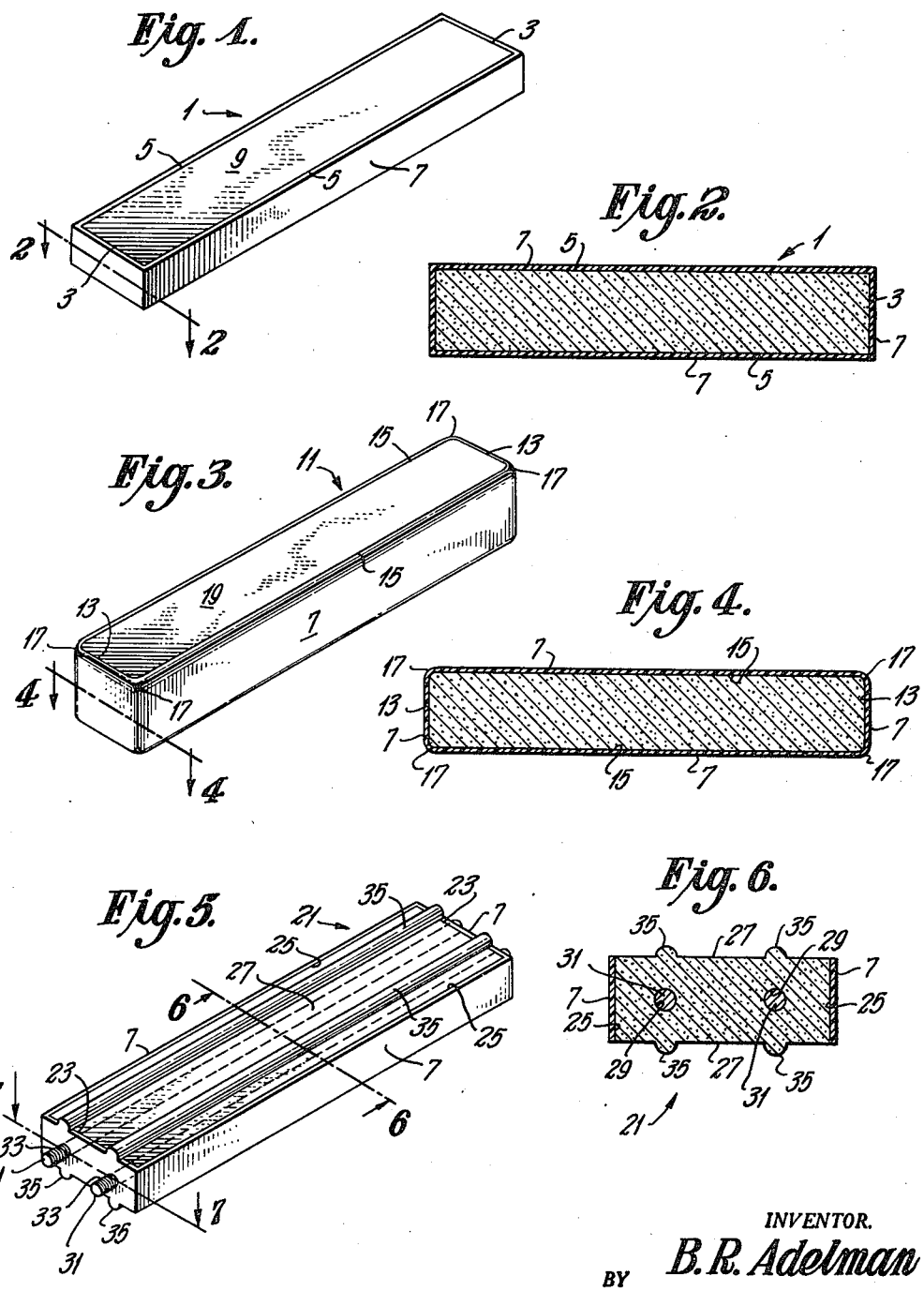
INVENTOR.
BY B. R. Adelman
Hudson & Young
ATTORNEYS June 7, 1960  B. R. ADELMAN  2,939,396
ROCKET GRAIN
Filed Sept. 2, 1954  2 Sheets-Sheet 2
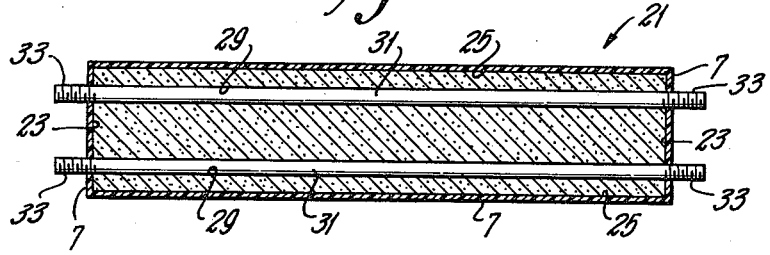
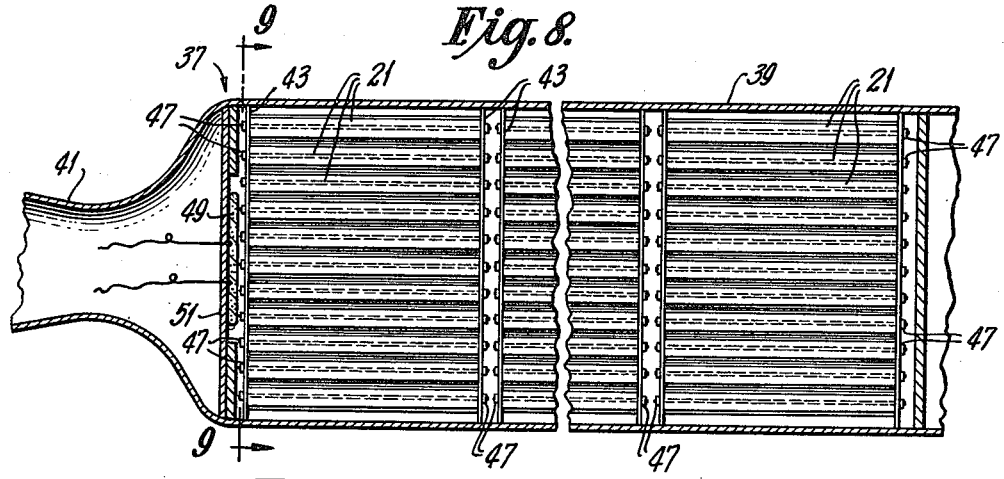
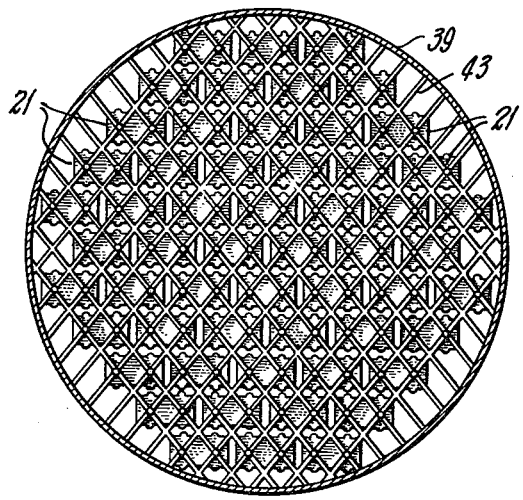
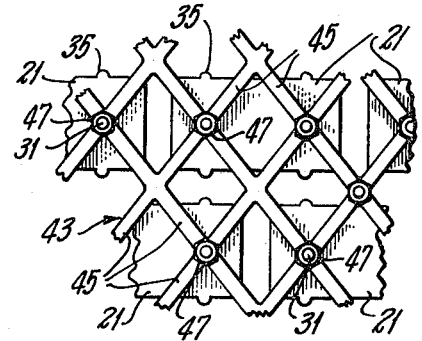
INVENTOR.
B. R. Adelman
BY
Hudson & Young
ATTORNEYS

# United States Patent Office 2,939,396
Patented June 7, 1960

2,939,396
ROCKET GRAIN
Barnet R. Adelman, Waco, Tex., assignor to Phillips Petroleum Company, a corporation of Delaware
Filed Sept. 2, 1954, Ser. No. 453,772
3 Claims. (Cl. 102—98)

This invention relates to a rocket grain. In a further aspect, this invention relates to an improved design for a rocket grain for use in large rocket motors. In a still further aspect, this invention relates to a rocket grain having a double web thickness.

A major problem in the design and manufacture of large rocket motors is that of handling the great weights of propellant material involved. By a large rocket motor, I refer to, for example, a rocket motor having a 6000 pound charge of propellant material. The manufacture of a single 6000 pound solid charge presents very difficult, perhaps insurmountable problems in obtaining a charge which burns at a uniform rate to deliver the maximum thrust without undue pressure build-up. Furthermore, extrusion equipment for such a large grain is not believed to be practical.

It is desirable that rocket motors can be manufactured having any desired size of charge in the full range up to and beyond the 6000 pound charge mentioned before. It is also desirable that a practical and economical solution be provided for this problem which does not involve the fabrication of special equipment for handling large and heavy charges of propellant material.

Accordingly, it is an object of this invention to provide an improved rocket grain.

It is a further object to provide an improved design for a propellant charge for large rocket motors.

It is a still further object to provide a rocket grain which burns at a uniform rate and delivers the maximum thrust without undue pressure build-up.

Finally, it is an object of this invention to provide a rocket grain which is readily adaptable to provide the charge for a wide range of sizes of rocket motors, including large rocket motors, such as one having a 6000 pound charge of propellant material.

Other objects and advantages will be apparent to one skilled in the art upon reading this specification and studying the accompanying drawings, in which:

Figure 1 is a perspective view of a grain according to this invention;

Figure 2 is a cross-sectional view on line 2—2 of Figure 1;

Figure 3 is a perspective view of a grain formed according to a modification of my invention;

Figure 4 is a cross-sectional view on line 4—4 of Figure 3;

Figure 5 is a perspective view of a grain formed according to a further modification of my invention;

Figure 6 is a cross-sectional view on line 6—6 of Figure 5;

Figure 7 is a cross-sectional view on line 7—7 of Figure 5;

Figure 8 is a side elevation of a rocket motor incorporating a plurality of grains of propellant material formed according to my invention;

Figure 9 is a cross-sectional view on line 9—9 of Figure 8; and

Figure 10 is an enlarged, partial view of Figure 9.

According to my invention, there is provided a rocket grain which comprises a rectangular parallelepiped of propellant material, said grain being restricted on its ends and its sides and being unrestricted on its upper and lower surfaces. In accordance with this invention, such grains are made in a standard size and by combining a plurality of these standard size grains, a propellant charge is provided having any size desired. For example, to provide a 6000 pound propellant charge, individual grains are made of about 60 pounds of propellant material and about 100 of these grains are arranged in the combustion chamber of a rocket motor.

An important advantage for the grain of my invention is that propellant material having one-half the burning rate otherwise required can be used, since the grain has double web thickness. That is, burning takes place on the upper and lower surfaces simultaneously and takes place to only a limited extent on the ends and sides which are covered by a suitable burning restricting material. A further advantage for my grain is that ignition is easier than is possible with conventional internal-external burning charges. A still further advantage is that my grain delivers a neutral presure-time curve upon burning.

The use of a plurality of standard size grains in accordance with this invention has important advantages in the production of large rocket charges, also. Extrusion equipment for a 60 pound grain presents little or no difficulty, whereas extrusion equipment for a 6000 pound grain is not believed to be practical. Also, there is much greater safety to personnel in handling the smaller sized grains and there is much less economic risk in handling 60 pounds of propellant material than there is in handling 6000 pounds of propellant material.

Referring now to Figures 1 and 2, there is shown, generally, a grain 1, formed in accordance with my invention, which is a rectangular parallelepiped having ends 3 and sides 5 which are rectangularly shaped. Ends 3 and sides 5 are covered with a layer 7 of burning restricting material. Grain 1 also has upper and lower surfaces 9 which are unrestricted. Figure 2 is a cross-sectional view on line 2—2 of Figure 1 and shows more clearly the layer 7 of burning restricting material on the ends 3 and sides 5 of grain 1. When grain 1 is ignited, it burns on upper and lower surfaces 9, simultaneously, thus providing a double web thickness.

The layer 7 of burning restricting material can be any of the slow-burning materials used for this purpose in the rocket art, such as cellulose acetate and ethyl cellulose. Also, metal plates can be secured to the sides and/or ends of the grain by plastic or rubber cements to provide support for the grain as well as performing the function of a burning restricting material for that portion of the grain.

Referring now to Figures 3 and 4, there is shown a modification of my invention wherein a grain 11 is a rectangular parallelepiped of propellant material having ends 13 which are squarely shaped and sides 15 which are rectangularly shaped. A feature of the modification shown in these figures is that grain 11 has rounded corners 17 which make the grain more stable to mechanical shock and is less subject to damage when being handled. Grain 11 has the ends 13 and the sides 15 covered with the layer 7 of burning restricting material, described above, and has upper and lower surfaces 19 which are unrestricted. When grain 11 is ignited, it burns on upper and lower surfaces 19 simultaneously. An advantage for the square ends 13 of grain 11 is that a plurality of these grains can be fitted into the combustion chamber of a rocket motor more easily and with less wasted space, in some instances, than is true with grain 1 shown in Figure 1 which has rectangularly shaped ends. Figure 4 is a cross-sectional view of grain 11 on lines 4—4 and shows more clearly the rounded corners 17 and the layer 7 of burning restricting material on ends 13 and sides 15.

It is desirable in some uses of rocket grains to provide additional support against mechanical shock. To this end, my rocket grains are equipped with internal support rods. These rods give strength to the grain and also provide a means for attaching the grain to a support grid in a rocket combustion chamber. Internal support rods for rocket grains are known in the prior art. However, a serious disadvantage for the internally supported grains of the prior art is that, upon burning, the grain burns off from from the support rod before the grain has been wholly consumed. Pieces of the unburned grain become lodged in the support grid and the possibility of dangerous build-ups in pressure within the combustion chamber is created.

This serious disadvantage, particularly in large grains, is overcome in a preferred embodiment of the rocket grain of my invention, shown in Figures 5, 6 and 7, which has at least one internal support rod and which is formed in a manner to prevent the grain from prematurely burning off from the support rod. In Figure 5, a grain 21 is, generally, a rectangular parallelepiped of propellant material having rectangularly shaped ends 23, sides 25 and upper and lower surfaces 27. Ends 23 and sides 25 are covered with the layer 7 of burning restricting material and upper and lower surfaces 27 are unrestricted. Grain 21 has at least one centrally disposed, longitudinally extending perforation 29, more clearly shown in the cross-sectional views in Figures 6 and 7. A rod-like supporting member 31 is disposed in each of perforations 29. Support member 31 fits tightly within perforation 29. To provide a means for attaching grain 21 to a support grid in the combustion chamber of a rocket motor, support member 31 can have threaded protruding ends 33, as is shown in Figures 5 and 7. Support members 31 can be metal or plastic rods and such plastic rods can be formed by extrusion into the preformed perforation 29 in grain 21.

It will be appreciated that the grains of this invention depend on simultaneous burning of the unrestricted upper and lower surfaces of the grain for efficient operation. Furthermore, the premature burning off from the internal support member which occurs in the rocket grains of the prior art is a serious disadvantage which is overcome by the modification of my invention shown in Figure 5. Accordingly, upper and lower surfaces 27 of grain 21 are provided with an outwardly-protruding, longitudinally extending rib 35 in alignment with each of said perforations 29. The total surface area of rib 35 on upper and lower surface 27 is equal to the surface area of perforation 29. Thus, upper and lower surfaces 27 of grain 21 are compensated for the surface area occupied by perforation 29 and burning on these surfaces takes place evenly and without premature burning off from support member 31 in perforation 29.

As has been indicated, more than two, i.e., 3 or 4, support rods each with compensating ribs on the upper and lower surfaces of the grain can be used. These rods should all be in the same horizontal plane within the grain to provide the maximum support throughout burning of the grain.

It will be obvious to those skilled in the art that the specific features of design described above in connection with grains 1, 11 and 21, shown in Figures 1 to 7, can be interchanged and alternated to suit particular needs and situations. The descriptions given in connection with the figures in the drawings are intended to exemplify preferred embodiments of my invention and should not be used to unduly limit the scope of my invention. For example, grains 1 and 21 can have the rounded corners 17 and square shaped ends of grain 11. Furthermore, support members 31 in grain 21 need not have threaded protruding ends 33 for attachment to a support grid in a rocket combustion chamber in the event that other means for attaching said grain to said grids is provided. For example, a metal plate can be used as the layer 7 of burning restricting material on ends 23 and/or sides 25 of grain 21 and the metal plate itself can be used as a means for attachment of the grain to the support grid.

Since the rocket grains of this invention burn on the upper and lower surfaces simultaneously, each grain must be mounted in a rocket combustion chamber in a spaced relationship with respect to each other in order that this burning can occur. In Figures 8, 9 and 10, there is shown in a schematic way, a side elevation of a rocket 37 having a cylindrical combustion chamber 39, the rear end of which is shaped to define a nozzle or venturi 41 for the discharge at a high velocity of the combustion gases liberated by the propellant to propel the rocket forward. Obviously, a separate nozzle portion could be substituted for the integral construction shown. Disposed in chamber 39, are a plurality of grains formed in accordance with this invention. The grains are supported in a spaced relationship with respect to each other by a support grid 43 made of crossing bars 45, shown in Figure 10. A plurality of grains 21, illustrated in Figures 5 to 7 herein, are shown in chamber 39 and grains 21 are attached to support grid 43 by the threaded ends 33 of support members 31 in the grain 21. This is more clearly shown in Figures 9 and 10. Threaded ends 33 extend through holes at the intersections of bars 45 and are attached thereto by a nut 47.

Ignition of the grains in chamber 39 can be accomplished by any conventional means, such as an electrically actuated igniter 49 mounted within combustion chamber 39. Igniter 49 can be mounted adjacent to a blowout type sealing disk 51 which is provided across the forward end of venturi 41.

The rocket grains of this invention can be prepared from any of the known solid propellant materials. Due to the permissible double web thickness of the rocket grains of this invention, a propellant material having a burning rate one-half as fast as would be otherwise required, can be used. Smokeless powder and a slow burning propellant material, such as a 75/25 ammonium nitrate in rubber binder composition, can be used. The latter composition can be expected to have the following empirical formulation:

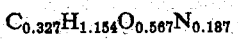
$C_{0.327}H_{1.154}O_{0.567}N_{0.187}$

Another typical solid propellant material which can be used is one formed of about 3 parts of a perchlorate oxidizer per part fuel, such as air-blown asphalt or polysulfide rubber, by weight.

The burning restricting material, such as ethyl cellulose mentioned hereinbefore, can be secured to the propellant charge by various rubber and plastic cements. In the event that metal plates are used to restrict the ends of the grain, or the sides as well, a very efficient bonding material is one which is resilient after being cured, such as a synthetic rubber prepared by the polymerization or copolymerization of conjugated dienes, either alone or with copolymerizable monomers.

Since many possible embodiments may be made of this invention without departing from the scope thereof, it is to be understood that all matter herein set forth or shown in the accompanying drawings is to be interpreted as illustrative and not as unduly limiting the invention.

I claim:

1. A rocket grain comprising a rectangular parallelepiped of propellant material, said grain having at least one centrally-disposed, longitudinally-extending perforation and a rod-like supporting member in said perforation, the upper and lower surfaces of said grain having outwardly-protruding, longitudinally-extending ribs in alignment with said perforation, the total surface area of said upper and lower surface ribs being equal to the surface area of said perforation, said grain being restricted on its ends and sides and being unrestricted on said upper and lower surfaces.

2. A rocket grain in accordance with claim 1 having two centrally-disposed, longitudinally-extending perforations, the axis of both of said perforations being in the same horizontal plane, and wherein said supporting members having threaded ends which protrude beyond said ends of said grain.

3. The rocket grain of claim 1 wherein the corners of said parallelepiped are rounded.

References Cited in the file of this patent
UNITED STATES PATENTS

| | | |
|---|---|---|
| 199,723 | Laidley | Jan. 29, 1878 |
| 766,455 | Maxim | Aug. 2, 1904 |
| 1,074,809 | Newton | Oct. 7, 1913 |
| 2,434,652 | Hickman | Jan. 20, 1948 |
| 2,484,355 | Parsons | Oct. 11, 1949 |
| 2,488,154 | Africano | Nov. 15, 1949 |
| 2,549,005 | Preckel | Apr. 17, 1951 |
| 2,643,611 | Ball | June 30, 1953 |
| 2,661,595 | Kuller et al. | Dec. 8, 1953 |
| 2,728,295 | Rubin et al. | Dec. 27, 1955 |
| 2,813,487 | Miller et al. | Nov. 19, 1957 |